(No Model.)
H. C. HODGES.
COMPOSITE BEAM.
No. 420,201. Patented Jan. 28, 1890.
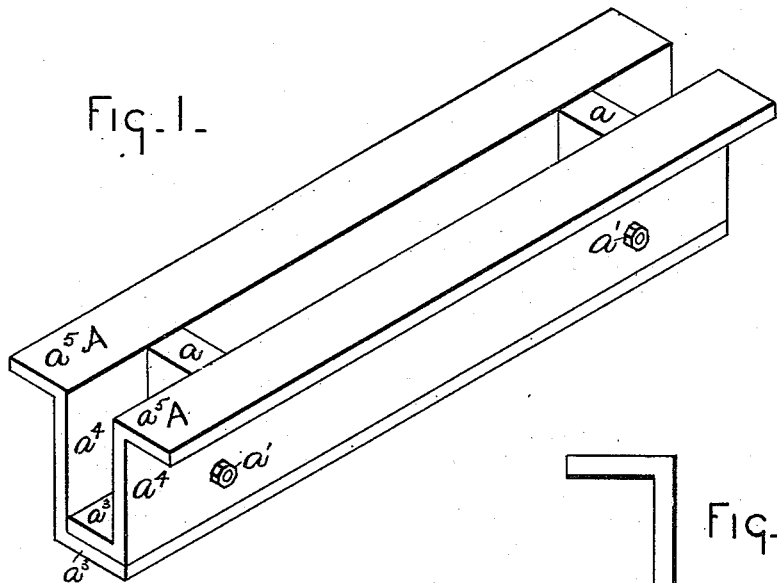
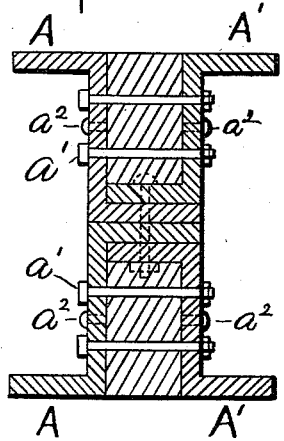
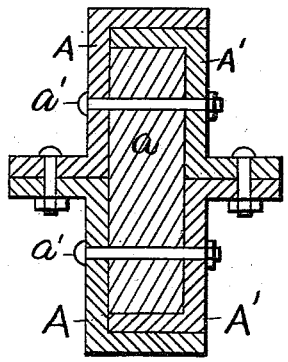
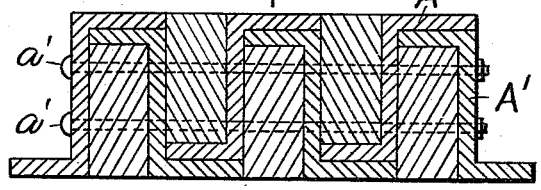
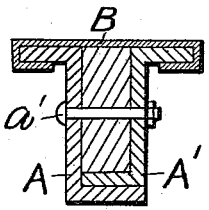
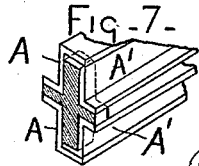
WITNESSES
C. J. Shipley
F. Clough
INVENTOR
Henry C. Hodges
By Wells W. Leggett & Co.
Attorneys.
N. PETERS, Photo-Lithographer, Washington, D. C.

UNITED STATES PATENT OFFICE.

HENRY C. HODGES, OF DETROIT, MICHIGAN.

COMPOSITE BEAM.

SPECIFICATION forming part of Letters Patent No. 420,201, dated January 28, 1890.

Application filed October 15, 1889. Serial No. 327,066. (No model.)

*To all whom it may concern:*

Be it known that I, HENRY C. HODGES, a citizen of the United States, residing at Detroit, county of Wayne, State of Michigan, have invented a certain new and useful Improvement in Composite Beams; and I declare the following to be a full, clear, and exact description of the invention, such as will enable others skilled in the art to which it pertains to make and use the same, reference being had to the accompanying drawings, which form a part of this specification.

In the drawings, Figure 1 is a perspective view of a composite beam embodying my invention. Fig. 2 is a sectional view of one of the elements of Z-iron, of which the beam is composed. Fig. 3 is a view of a variation in which a compound beam is made of two of the composite beams placed loop to loop. Fig. 4 is a variation in which a compound beam is made of two composite beams placed flange to flange. Fig. 5 is another variation in which a broad compound beam is formed by several of the Z-irons placed side by side. Fig. 6 shows a supplemental clamp which engages over the outturned flanges to prevent spreading. Fig. 7 is a variation applicable to the forms of compound beams shown in Figs. 3 and 4.

It is the purpose of my invention to produce a composite beam which shall be capable of employment in the various situations where I-beams are usually employed, and which from its construction may be produced at a less expense than I-beams, said composite beams of a given weight being capable of withstanding greater cross-strains in directions either normal to the flanges or normal to the webs.

In carrying out my invention, A represents one of the elements of Z-iron and A' the other of which my composite beam is made. $a$ represents separating or truss blocks of metal interposed at intervals between the webs and preferably adapted to fill and fit the said space between the rails of Z-iron where they are located. They are held in place by bolts $a'$, or instead of bolts the blocks might be cast with malleable studs projecting therefrom through holes in the Z-irons, after which they may be rivet-headed, as shown in Fig. 3 at $a^2$.

To construct the composite beam, I take two bars of Z-iron and place them side by side, as shown in Fig. 1, with the flanges $a^3$ lapping upon and past each other, with the webs $a^4$ parallel, and with the flanges $a^5$ outturned therefrom. The truss-blocks $a$ are then put into position and bolted or riveted in place. If any further fastening is necessary to prevent the elements from spreading apart, clamps B—such as are shown in Fig. 6—may be engaged at intervals over the outturned flanges, as shown, and the lapping flanges in all forms of the beam may be united by bolts or rivets, as indicated in Fig. 3. Where the metal is quite thin, two pieces of like dimensions may be united into a composite beam; but where the metal is heavier it is best to employ two dimensions of Z-iron, one having its flange $a^3$ narrower by the thickness of the web than its companion piece and with its web shorter by the thickness of a flange than its companion piece. This serves to bring the outturned flanges to the same level and permits the outer flange at the loop to lap to the outer face of the web of the companion element. This makes a neat and uniform structure.

This invention admits of several variations. Thus, as shown in Fig. 3, two of the composite beams might be united loop to loop and constitute a compound beam at once cheap and very strong; or, as shown in Fig. 4, they might be united flange to flange and the filling-pieces or truss-blocks $a$ made of double length, so as to constitute the truss-block of both beams. Again, as shown in Fig. 5, several of these Z-iron elements might be grouped and united side by side upon interposed truss-blocks $a$, and so make a broad compound beam.

A beam of the character I have described, made up of Z elements, it is apparent, is well adapted to stand strains of compression or extension the same as I-beams, while, owing to the double webs, will withstand a greater strain normal to its flanges. Moreover, owing to the space between the webs and the interposed truss-blocks, the beam is much stiffer and stronger to withstand strains normal to the webs.

I would have it understood that these beams may be made of any kind of metal, and are designed for use in all kinds of structures where the usual I-beams are or may be employed. It is also equally well adapted for use wherever channel or angle iron or other structural forms of iron are employed.

In making compound beams to withstand endwise compression the composite beams, instead of being adjusted in contact with each other, may, if desired, be separated at intervals by blocks $d$, as shown in Fig. 7.

What I claim is—

1. A composite beam composed of two Z-shaped elements united upon interposed separating or truss-blocks, as shown, with the flanges at the loop lapping over each other, substantially as and for the purposes described.

2. A composite beam composed of two Z-shaped elements united upon interposed truss-blocks, with the flanges at the loop lapped upon each other, the inner one of said lapping flanges of less breadth than its companion and its corresponding web of less depth than that of the companion element, substantially as and for the purposes described.

3. A composite beam composed of two Z-shaped elements united upon filling or truss blocks and with the flanges at the loop lapped upon each other, the inner of said flanges being shorter than the outer one by the thickness of the web, and the web of the same beams being of a depth less than that of the other beam by the thickness of the flange, substantially as and for the purposes described.

4. A compound beam composed of two composite beams constructed of Z-shaped elements, with their flanges lapping as described and fastened together, substantially as shown.

5. The broad compound beam composed of Z-shaped elements arranged side by side, with their flanges lapping past each other, interposed truss-blocks, and bolts $a'$ for binding them together, substantially as and for the purposes described.

6. A composite beam composed of two Z-shaped elements united upon filling or truss blocks, with their flanges at the loop lapped upon each other, and with one or more clamps B, substantially as and for the purposes described.

7. A beam made of several Z-shaped elements arranged side by side, with their flanges lapping alternately at top and bottom, interposed blocks $a$, and bolts or fastenings $a'$ for binding the elements together, substantially as and for the purposes described.

8. A composite beam composed of two Z-shaped elements arranged with their flanges at one edge turned toward each other and lapping the one over the other and fastened together by bolts or rivets passing through the said lapping parts, substantially as described.

9. A composite beam composed of two Z-shaped elements arranged with their flanges at one edge turned toward each other and lapping the one over the other, said Z-shaped elements united to prevent their collapsing together or spreading apart, substantially as described.

In testimony whereof I sign this specification in the presence of two witnesses.

HENRY C. HODGES.

Witnesses:
 W. H. CHAMBERLIN,
 L. A. DOELTZ.